(12) United States Patent
Ding et al.

(10) Patent No.: US 11,808,743 B2
(45) Date of Patent: Nov. 7, 2023

(54) ION CHROMATOGRAPHY (IC) SUPPRESSOR

(71) Applicant: QINGDAO SHENGHAN CHROMATOGRAPH TECHNOLOGY CO., LTD., Qingdao (CN)

(72) Inventors: Chuncheng Ding, Qingdao (CN); Yangyang Sun, Qingdao (CN); Enlai Zhang, Qingdao (CN); Xizhi Zhang, Qingdao (CN)

(73) Assignee: QINGDAO SHENGHAN CHROMATOGRAPH TECHNOLOGY CO., LTD., Qingdao (CN)

( * ) Notice: Subject to any disclaimer, the term of this patent is extended or adjusted under 35 U.S.C. 154(b) by 146 days.

(21) Appl. No.: 17/607,889

(22) PCT Filed: Dec. 28, 2020

(86) PCT No.: PCT/CN2020/139994
§ 371 (c)(1),
(2) Date: Oct. 31, 2021

(87) PCT Pub. No.: WO2021/147619
PCT Pub. Date: Jul. 29, 2021

(65) Prior Publication Data
US 2022/0229030 A1 Jul. 21, 2022

(30) Foreign Application Priority Data
Jan. 20, 2020 (CN) .................... 202010062988.X (51) Int. Cl.
*G01N 30/96* (2006.01)
*G01N 30/14* (2006.01)
*G01N 30/60* (2006.01)

(52) U.S. Cl.
CPC ............. *G01N 30/96* (2013.01); *G01N 30/14* (2013.01); *G01N 2030/146* (2013.01); *G01N 2030/965* (2013.01)

(58) Field of Classification Search
CPC ........ G01N 30/96; G01N 30/14; G01N 30/60; B01D 15/367
(Continued)

(56) References Cited

U.S. PATENT DOCUMENTS 4,751,189 A * 6/1988 Rocklin ................. G01N 30/96
436/178
4,999,098 A 3/1991 Pohl et al.
(Continued)

FOREIGN PATENT DOCUMENTS

CN 1764493 A 4/2006
CN 2828817 Y 10/2006
(Continued)

OTHER PUBLICATIONS

Steve Rabin, et al., New membrane-based electrolytic suppressor device for suppressed conductivity detection in ion chromatography, Journal of Chromatography, 1993, pp. 97-109, vol. 640.
(Continued)

*Primary Examiner* — Arlen Soderquist
(74) *Attorney, Agent, or Firm* — Bayramoglu Law Offices LLC (57) ABSTRACT

An ion chromatography (IC) suppressor includes a first clamping plate, an intermediate plate, a second clamping plate, a first ion exchange membrane, a second ion exchange membrane, a first electrode and a second electrode. The first clamping plate, the intermediate plate and the second clamping plate are tightly buckled in sequence to compact the first ion exchange membrane between the first clamping plate and the intermediate plate and compact the second ion
(Continued)

exchange membrane between the intermediate plate and the second clamping plate. Resin particles are filled between the two ion exchange membranes. An eluent inlet and an eluent outlet are provided respectively at two ends of the intermediate plate, and an accommodating groove is formed at each of a tail end of the eluent inlet and a head end of the eluent outlet. The first clamping plate and the second clamping plate are provided with a sealing lip, respectively.

11 Claims, 7 Drawing Sheets

(58) Field of Classification Search
USPC .......................................................... 436/161
See application file for complete search history.

(56) References Cited

U.S. PATENT DOCUMENTS

| | | | | |
|---|---|---|---|---|
| 5,569,365 | A * | 10/1996 | Rabin | G01N 30/96 210/659 |
| 5,633,171 | A * | 5/1997 | Small | G01N 30/96 436/175 |
| 6,077,434 | A * | 6/2000 | Srinivasan | G01N 30/96 204/542 |
| 2002/0162804 | A1* | 11/2002 | Srinivasan | G01N 30/96 210/651 |
| 2004/0149581 | A1* | 8/2004 | Srinivasan | G01N 30/96 204/627 |
| 2010/0038245 | A1* | 2/2010 | Small | G01N 30/96 204/520 |
| 2014/0134050 | A1* | 5/2014 | Srinivasan | G01N 30/96 422/70 |
| 2014/0332387 | A1* | 11/2014 | Srinivasan | B01J 41/20 204/632 |
| 2016/0187305 | A1* | 6/2016 | Srinivasan | B01J 47/04 210/85 |
| 2017/0276296 | A1 | 9/2017 | Wiederin et al. | |
| 2020/0132639 | A1* | 4/2020 | Sakamoto | B01D 15/08 |
| 2020/0240968 | A1* | 7/2020 | Srinivasan | G01N 30/96 |

FOREIGN PATENT DOCUMENTS

| | | |
|---|---|---|
| CN | 101910835 A | 12/2010 |
| CN | 202693540 U | 1/2013 |
| CN | 205263043 U | 5/2016 |
| CN | 106198844 A | 12/2016 |
| CN | 106932507 A | 7/2017 |
| CN | 110637230 A | 12/2019 |
| CN | 111214848 A | 6/2020 |
| JP | 2012121019 A | 6/2012 |

OTHER PUBLICATIONS

Guobin Shen, et al., An integrated device of electrodialytic membrane suppressor and charge detector for ion chromatography, Analytica Chimica Acta, 2016, pp. 131-135, vol. 943.

* cited by examiner

ION CHROMATOGRAPHY (IC) SUPPRESSOR

CROSS REFERENCE TO THE RELATED APPLICATIONS

This application is the national phase entry of International Application No. PCT/CN2020/139994, filed on Dec. 28, 2020, which is based upon and claims priority to Chinese Patent Application No. 202010062988.X, filed on Jan. 20, 2020, the entire contents of which are incorporated herein by reference.

TECHNICAL FIELD

The present invention relates to the field of ion chromatography (IC), and more particularly, to an IC suppressor.

BACKGROUND

In ion chromatography (IC), a suppressor plays the main roles of reducing the background conductance of a mobile phase, increasing the conductance response of an ion to be tested, and the like, which makes the IC technology truly become an effective ion analysis means. Therefore, the suppressor is one of the key components for IC. Packed column suppressors, fiber suppressors, and micro-membrane suppressors were used early, and suppressors currently used combine a membrane technology and an electrochemical technology. The prior suppressors, however, mainly have the shortcomings of low pressure resistance and easy leakage, so that the prior suppressors need to be frequently maintained, and also need to be rinsed once a week or two to make the suppressors wet. In addition, the prior suppressors involve complicated assembly and difficult consistency control.

When the prior suppressor is internally packed with resin particles to control a dead volume, a pore size of an eluent inlet or outlet is generally required to be less than 50 μm, namely, smaller than a particle size of the internally packed particles, which will make the inlet or outlet of an eluent channel slender and thus results in high processing requirements, low yield rate, and high cost. Moreover, the particle size of the packed particles cannot completely be controlled within a preset particle size range, and the packed particles may also be broken during use, which may block the inlet and outlet and thus causes an increase in a pressure of a suppressor. In addition, a mesh screen suppressor is also used. The mesh screen structure used during processing is obtained by processing a conductive and corrosion-resistant material into a mesh structure, which involves stringent material selection and processing requirements.

SUMMARY

An objective of the present invention is to provide an IC suppressor to solve the existing technical problems in the above-mentioned background art.

In order to solve the above technical problems, the present invention provides the following technical solution: An IC suppressor is provided, including a first clamping plate, an intermediate plate, a second clamping plate, a first ion exchange membrane, a second ion exchange membrane, a first electrode and a second electrode, where the first clamping plate, the intermediate plate and the second clamping plate are tightly buckled in sequence to compact the first ion exchange membrane between the first clamping plate and the intermediate plate and compact the second ion exchange membrane between the intermediate plate and the second clamping plate; a suppression chamber is formed between the first ion exchange membrane and the second ion exchange membrane, and the suppression chamber is filled with resin particles for ion exchange and support; the first electrode is embedded on a side of the first clamping plate adjacent to the intermediate plate, and a first electrolysis chamber is formed between the first electrode and the first ion exchange membrane; the second electrode is embedded on a side of the second clamping plate adjacent to the intermediate plate, and a second electrolysis chamber is formed between the second electrode and the second ion exchange membrane; the first ion exchange membrane and the second ion exchange membrane separate the suppression chamber, the first electrolysis chamber, and the second electrolysis chamber into three independent chambers; an eluent inlet and an eluent outlet are provided respectively at two ends of the intermediate plate, and an accommodating groove for mounting a screen plate is formed at each of a tail end of the eluent inlet and a head end of the eluent outlet; a first electrolyte inlet and a first electrolyte outlet are formed on a side of the first clamping plate away from the intermediate plate; and a second electrolyte inlet and an exhaust gas-liquid outlet are formed on a side of the second clamping plate away from the intermediate plate.

On the basis of the above technical solution, the screen plate may be provided at each of a tail end of the first electrolyte inlet, a head end of the first electrolyte outlet, a tail end of the second electrolyte inlet, and a head end of the exhaust gas-liquid outlet.

On the basis of the above technical solution, the screen plate may be made from polyethylene (PE).

On the basis of the above technical solution, the side of the first clamping plate adjacent to the intermediate plate and the side of the second clamping plate adjacent to the intermediate plate may be respectively provided with a sealing lip for sealing and separation, and the first ion exchange membrane and the second ion exchange membrane may be respectively adapted to the sealing lip.

On the basis of the above technical solution, a groove may be formed on the intermediate plate, a shape of the groove may be adapted to a shape of the first ion exchange membrane, and the groove is configured to mount and position the first ion exchange membrane.

On the basis of the above technical solution, each of the first electrode and the second electrode may be a titanium electrode, and a surface of the titanium electrode may be coated with a corrosion-resistant inert metal.

On the basis of the above technical solution, the first electrolysis chamber and the second electrolysis chamber may be filled with the resin particles for support and diversion.

On the basis of the above technical solution, an outer side of the first clamping plate and an outer side of the second clamping plate may be provided with a first pressing plate and a second pressing plate, respectively; and the first pressing plate and the second pressing plate may be connected through a bolt.

On the basis of the above technical solution, an outer side of the first pressing plate and an outer side of the second pressing plate may be provided with a first housing and a second housing, respectively; and the first housing and the second housing may be buckled to package the first pressing plate, the first clamping plate, the first electrode, the first ion exchange membrane, the intermediate plate, the second ion exchange membrane, the second electrode, the second clamping plate, and the second pressing plate.

On the basis of the above technical solution, the eluent outlet may be connected to a conductivity cell; an outlet of the conductivity cell may be connected to the first electrolyte inlet; and the first electrolyte outlet may be connected to the second electrolyte inlet through a hose.

The technical solutions provided by the present invention have the following beneficial effects:

1. Resin particles are filled between the two ion exchange membranes. On the one hand, the resin particles can support the two ion exchange membranes to avoid collapse and bulging, which may cause an incomplete suppression reaction and thus affects a peaking effect of a chromatogram. On the other hand, the resin particles enable ion exchange to make a reaction complete and a suppression complete.

2. A screen plate is provided at each of a tail end of the eluent inlet and a head end of the eluent outlet, which can effectively retain the resin particles in the suppression chamber, and is suitable for the situation where the eluent inlet and outlet have a large pore size, thereby reducing the processing difficulty of the eluent inlet and outlet channels.

3. The first clamping plate and the second clamping plate are respectively provided with a sealing lip adapted to the first ion exchange membrane and the second ion exchange membrane, which plays a sealing role and avoids liquid leakage.

4. Resin particles are filled inside the first electrolysis chamber and the second electrolysis chamber, which support the ion exchange membranes and can also guide a regeneration solution.

5. A groove is formed on the intermediate plate to facilitate the mounting and positioning of the first ion exchange membrane and make the overall assembly easy and convenient.

6. The eluent outlet is connected to a conductivity cell, and water produced by the conductivity cell enters the first electrolysis chamber and the second electrolysis chamber, thereby realizing the regenerative recycling of an electrolyte in the suppressor device.

DETAILED DESCRIPTION OF THE EMBODIMENTS

The present invention is described in further detail below with reference to the accompanying drawings and embodiments:

In the present invention, unless otherwise specified and defined, the terms such as "connected to", "connected with", and "fixed" should be comprehended in a broad sense. For example, these terms may be comprehended as being fixedly connected, removably connected, or integrally connected; may be comprehended as being directly connected, or indirectly connected through an intermediate medium; and may be comprehended as being in an internal communication between two elements or an interactive relationship between two elements. Those of ordinary skill in the art may understand specific meanings of the above terms in the present invention based on a specific situation.

In the description of the present invention, it should be understood that orientations or position relationships indicated by terms "left", "right", "front", "rear", "top", "bottom", and the like are orientation or position relationships as shown in the drawings, and these terms are just used to facilitate description of the present invention and simplify the description, but not to indicate or imply that the mentioned device or elements must have a specific orientation and must be established and operated in a specific orientation. Therefore, these terms cannot be understood as a limitation to the present invention.

Embodiment 1

As shown in FIG. 1 to FIG. 8, an IC suppressor is provided, including a first clamping plate 1, an intermediate plate 2, a second clamping plate 3, a first ion exchange membrane 4, a second ion exchange membrane 5, a first electrode 7 and a second electrode 9. The first clamping plate 1, the intermediate plate 2 and the second clamping plate 3 are tightly buckled in sequence to compact the first ion exchange membrane 4 between the first clamping plate 1 and the intermediate plate 2 and compact the second ion exchange membrane 5 between the intermediate plate 2 and the second clamping plate 3. A suppression chamber 6 is formed between the first ion exchange membrane 4 and the second ion exchange membrane 5, and the suppression chamber 6 is filled with resin particles for supporting and controlling a dead volume. More preferably, the suppression chamber 6 may have a length of 5.0 cm to 10.0 cm, a width of 0.5 cm to 1.0 cm, and a thickness of 0.3 cm to 1.0 mm.

The resin particles filled inside the suppression chamber 6 have electric conductivity. On the one hand, the resin particles can support the two ion exchange membranes to avoid collapse and bulging, which may cause an incomplete suppression reaction and thus affects a peaking effect of a chromatogram. On the other hand, the resin particles enable ion exchange to make a reaction complete and a suppression complete. By controlling a quantity of resin particles filled inside the suppression chamber, the dead volume in the suppression chamber can be controlled within an appropriate range, such that each ion peak on an ion chromatogram obtained has the characteristics of high signal, small peak width, and prominent resolution, which is convenient for the staff to analyze and process a chromatogram. If there are too few resin particles filled in the suppression chamber, the dead volume is too large, which is easy to cause poor resolution and makes a peak of each ion on an ion chromatogram not easily observed and distinguished. If there are too many resin particles filled in the suppression chamber, the dead volume is too small, which will cause an internal pressure of the suppressor to be high and thus makes the ion exchange membrane prone to burst and other undesirable phenomena.

Figure 1:
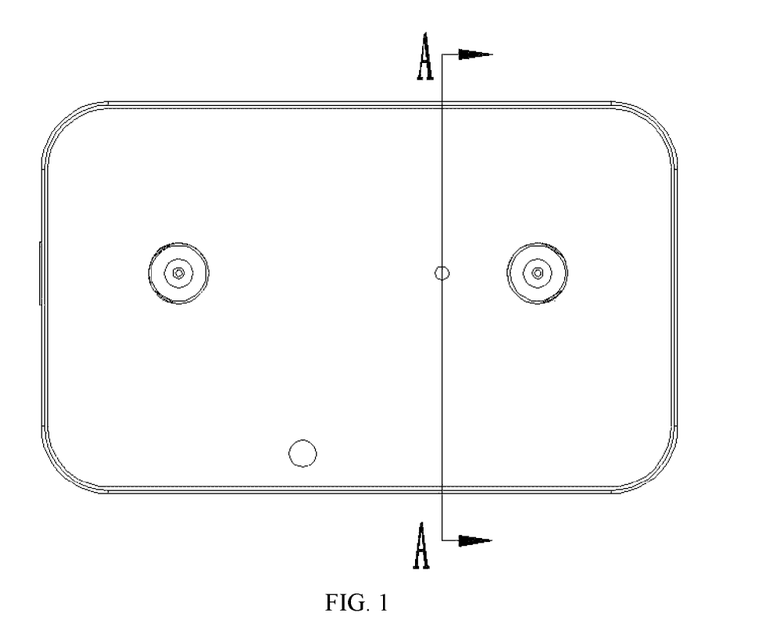
FIG. 1 is a front view of the present invention.
Figure 2:
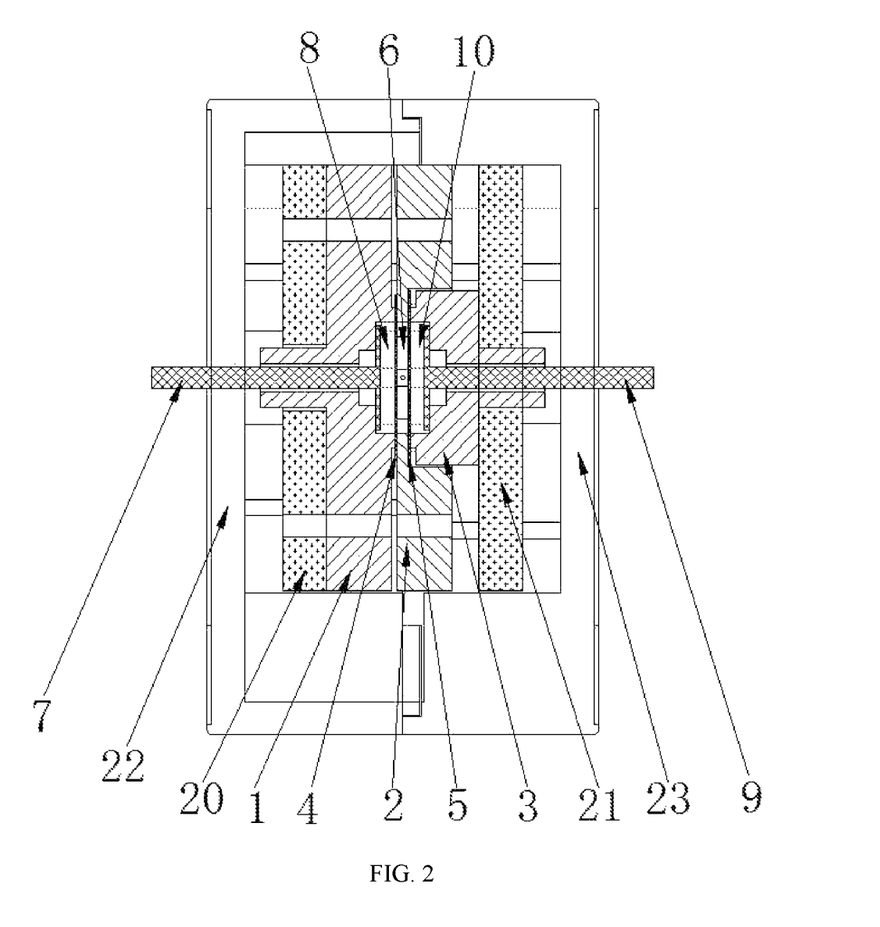
FIG. 2 is a schematic structural diagram of a cross section along A-A in FIG. 1.
Figure 3:
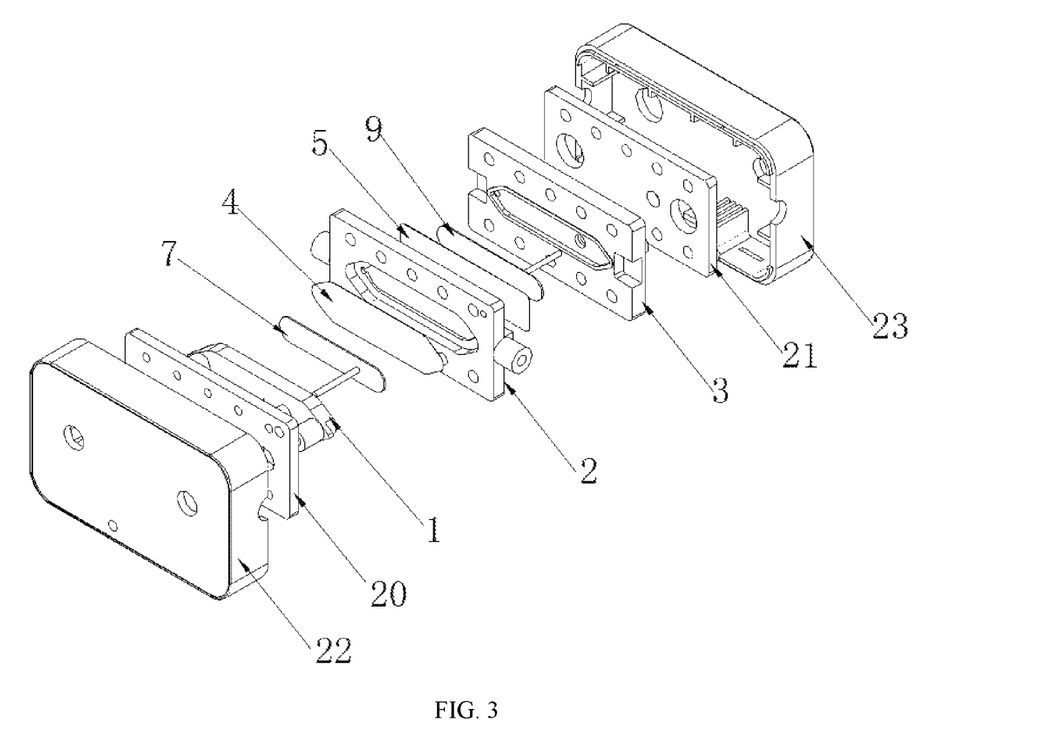
FIG. 3 is a schematic diagram illustrating an exploded structure of the present invention.

As shown in FIG. 2 and FIG. 3, the first electrode 7 is embedded on a side of the first clamping plate 1 adjacent to the intermediate plate 2, and a first electrolysis chamber 8 is formed between the first electrode 7 and the first ion exchange membrane 4. The second electrode 9 is embedded on a side of the second clamping plate 3 adjacent to the intermediate plate 2, and a second electrolysis chamber 10 is formed between the second electrode 9 and the second ion exchange membrane 5. Each of the first electrode 7 and the second electrode 9 is a titanium electrode, and a surface of the titanium electrode is coated with a corrosion-resistant inert metal. More preferably, the inert metal coating on the surface of the titanium electrode may be iridium or ruthenium. The inert metal coating on the electrode can enhance the corrosion resistance of the electrode and prolong the service life of the electrode.

The first ion exchange membrane 4 and the second ion exchange membrane 5 separate the suppression chamber 6, the first electrolysis chamber 8, and the second electrolysis chamber 10 into three independent chambers. In this way, the problem of interpenetration of an eluent among the various chambers can be avoided, and excellent sealing performance can be achieved. However, it should be noted that the above-mentioned increase in the sealing performance does not affect a normal ion exchange process among the various chambers.

Figure 5:
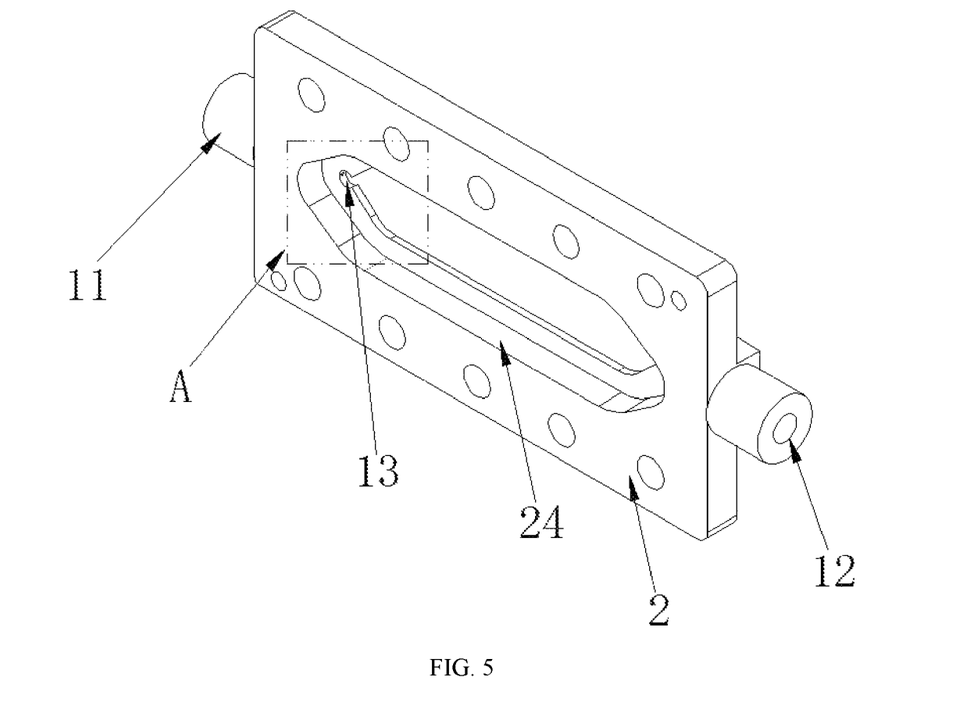
FIG. 5 is a schematic structural diagram of the intermediate plate of the present invention.
Figure 6:
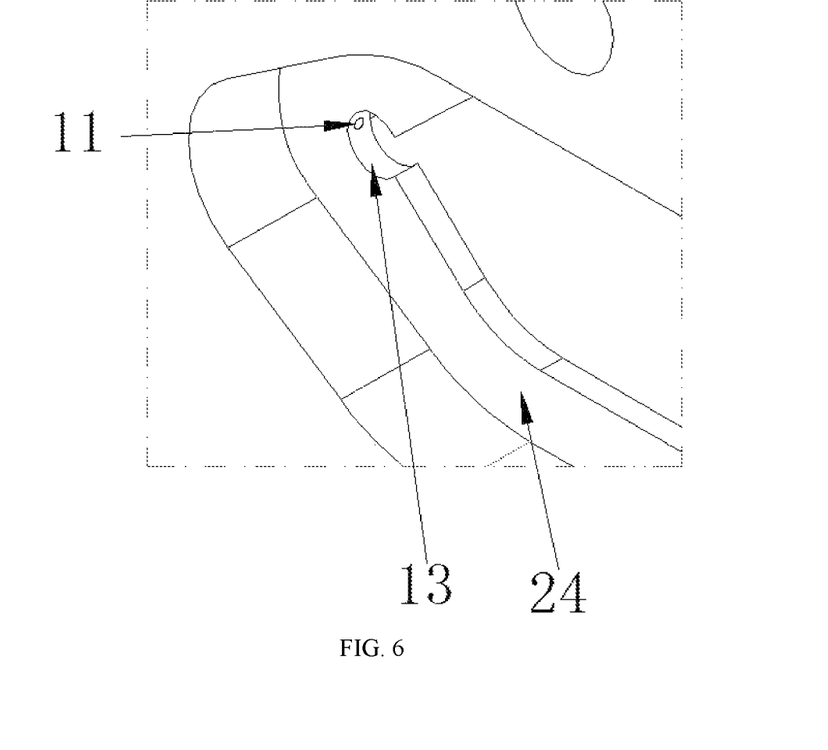
FIG. 6 is a schematic diagram illustrating an enlarged partial structure at A in FIG. 5.

As shown in FIG. 5 and FIG. 6, an eluent inlet 11 and an eluent outlet 12 are formed at two ends of the intermediate plate 2, and an accommodating groove 13 for mounting a screen plate 14 is formed at each of a tail end of the eluent inlet 11 and a head end of the eluent outlet 12. More preferably, the screen plate 14 may be made from PE. Since a pore size of the eluent inlet 11 or the eluent outlet 12 is larger than a particle size of the resin particles (specifically, the pore size of the eluent inlet 11 or the eluent outlet 12 is 0.5 mm, and the particle size of the resin particles is 50 μm to 150 μm), a screen plate 14 is provided at each of a tail end of the eluent inlet 11 and a head end of the eluent outlet 12 to effectively retain the resin particles in the suppression chamber 6. The accommodating groove 13 is provided with a screen plate 14, which is suitable for the situation where the eluent inlet and outlet have a large pore size, thereby reducing the processing difficulty of the eluent inlet and outlet channels.

Figure 4:
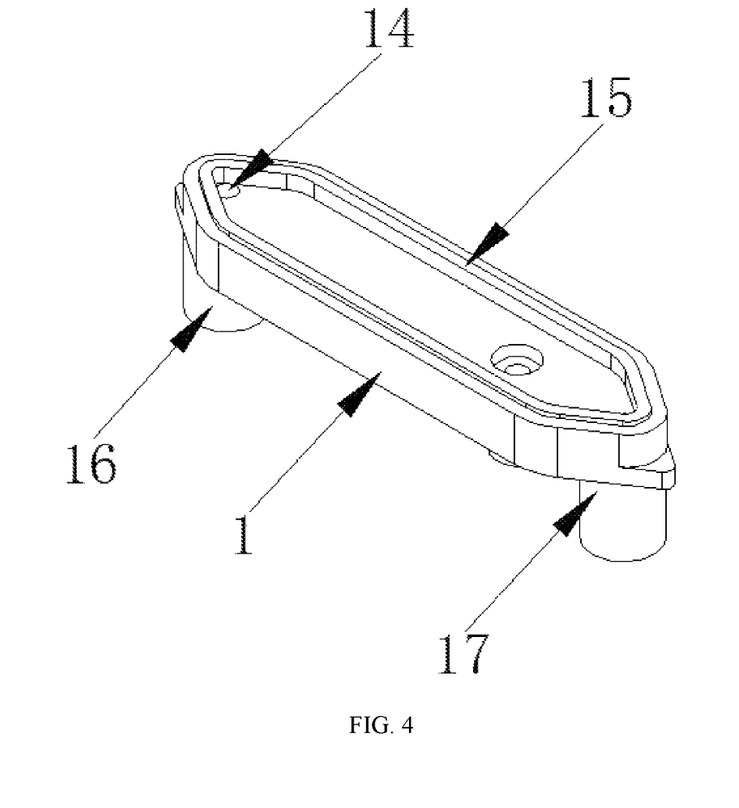
FIG. 4 is a schematic structural diagram of the first clamping plate of the present invention.
Figure 7:
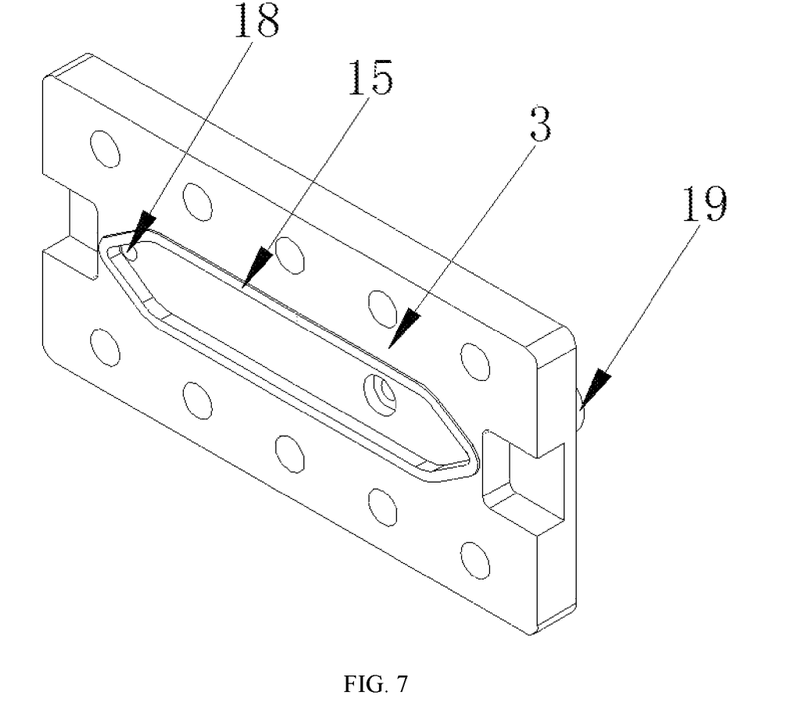
FIG. 7 is a schematic structural diagram of the second clamping plate of the present invention.

As shown in FIG. 4 and FIG. 7, the side of the first clamping plate 1 adjacent to the intermediate plate 2 and the side of the second clamping plate 3 adjacent to the intermediate plate 2 are respectively provided with a sealing lip 15 for sealing and separation, and the first ion exchange membrane 4 and the second ion exchange membrane 5 are respectively adapted to the sealing lip 15. The sealing lip 15 is provided to seal the first ion exchange membrane 4 and the second ion exchange membrane 5, which can avoid liquid leakage and provide excellent sealing performance.

A first electrolyte inlet 16 and a first electrolyte outlet 17 are formed on a side of the first clamping plate 1 away from the intermediate plate 2; and a second electrolyte inlet 18 and an exhaust gas-liquid outlet 19 are formed on a side of the second clamping plate 3 away from the intermediate plate 2. An electrolyte enters the first electrolysis chamber 8 and the second electrolysis chamber 10 from the first electrolyte inlet 16 and the second electrolyte inlet 18 to participate in a suppression reaction, and the electrolyte can enter the electrolysis chamber through an external water pipe or a recycling pipe inside the suppressor.

As shown in FIG. 2 and FIG. 3, an outer side of the first clamping plate 1 and an outer side of the second clamping plate 3 are provided with a first pressing plate 20 and a second pressing plate 21, respectively; and the first pressing plate 20 and the second pressing plate 21 are connected through a bolt. More preferably, the first pressing plate 20 and the second pressing plate 21 may be made of a metal. Since a metal plate has relatively high rigidity, the first clamping plate 1 and the second clamping plate 3 are fixedly compacted through surface fitting, which is reliable and can avoid damage to the first clamping plate 1 and the second clamping plate 3 inside.

An outer side of the first pressing plate 20 and an outer side of the second pressing plate 21 are provided with a first housing 22 and a second housing 23, respectively; and the first housing 22 and the second housing 23 are buckled to package the first pressing plate 20, the first clamping plate 1, the first electrode 7, the first ion exchange membrane 4, the intermediate plate 2, the second ion exchange membrane 5, the second electrode 9, the second clamping plate 3, and the second pressing plate 21 inside the suppressor. The first pressing plate 20, the second pressing plate 21, the first housing 22, and the second housing 23 are provided to make the entire suppressor buckled tightly and provide prominent sealing performance.

Embodiment 2

On the basis of Embodiment 1, as shown in FIG. 5, a groove 24 is formed on the intermediate plate 2, a shape of the groove 24 is adapted to a shape of the first ion exchange membrane 4, and the groove 24 is configured to mount and position the first ion exchange membrane 4. A groove 24 is formed on the intermediate plate 2 to facilitate the arrangement and fixation of the first ion exchange membrane 4. As shown in FIG. 4, a protrusion adapted to the groove 24 is provided on the first clamping plate 1 and a sealing lip 15 is provided on the first clamping plate 1 to seal the first ion exchange membrane 4 arranged in the groove. As mentioned above, this can facilitate the assembly of the suppressor device, and is more suitable for industrial production and application.

Embodiment 3

On the basis of Embodiment 2, the first electrolysis chamber 8 and the second electrolysis chamber 10 are filled with the resin particles for support and diversion. The resin particles are conductive. The filling of resin particles in the first electrolysis chamber 8 and the second electrolysis chamber 10 can support the first ion exchange membrane 4 and the second ion exchange membrane 5 and avoid the deformation of the ion exchange membranes and the increase of the dead volume. In addition, the resin particles can also guide an electrolyte and accelerate an electrolysis reaction process.

As shown in FIG. 4 and FIG. 7, more preferably, the screen plate 14 is provided at each of a tail end of the first electrolyte inlet 16, a head end of the first electrolyte outlet 17, a tail end of the second electrolyte inlet 18, and a head end of the exhaust gas-liquid outlet 19. It should be noted that the head end and the tail end here are defined according to a flowing direction of an electrolyte; and a position where the electrolyte flows in is the head end, and a position where the electrolyte flows out is the tail end. The screen plate 14 is provided mainly to restrict and intercept the resin particles filled in the first electrolysis chamber 8 and the second electrolysis chamber 10, thereby avoiding the loss of the resin particles and the blockage of the inlet and outlet.

In this embodiment, the assembly process and steps of an IC suppressor of the present invention are described, which will not be repeated in other embodiments.

An assembly process of the suppressor includes: 1. the first ion exchange membrane 4 is arranged into the groove 24 on the intermediate plate 2, a layer of resin particles is coated on the first clamping plate 1 with the first electrode 7, and then the first clamping plate 1 is buckled into the groove 24 on the intermediate plate 2; 2. resin particles are coated in the suppression chamber 6, and then the second ion exchange membrane 5 is arranged on a side of the intermediate plate 2 away from the groove 24; 3. the second clamping plate 3 with the second electrode 9 is coated with a layer of resin particles, and then buckled on a side of the intermediate plate 2 provided with the second ion exchange membrane 5 for fixing; 4. The first pressing plate 20 and the second pressing plate 21 are fixedly arranged on the outer side of the first clamping plate 1 and the outer side of the second clamping plate 3 respectively for compacting and fixing, and then the first housing 22 and the second housing 23 are buckled on the outermost side for fixing, thereby completing the assembly of the suppressor device. The assembly method of the suppressor provided in the present invention is simple, involves convenient operations, and is more suitable for industrial production and application.

Embodiment 4

Figure 8:
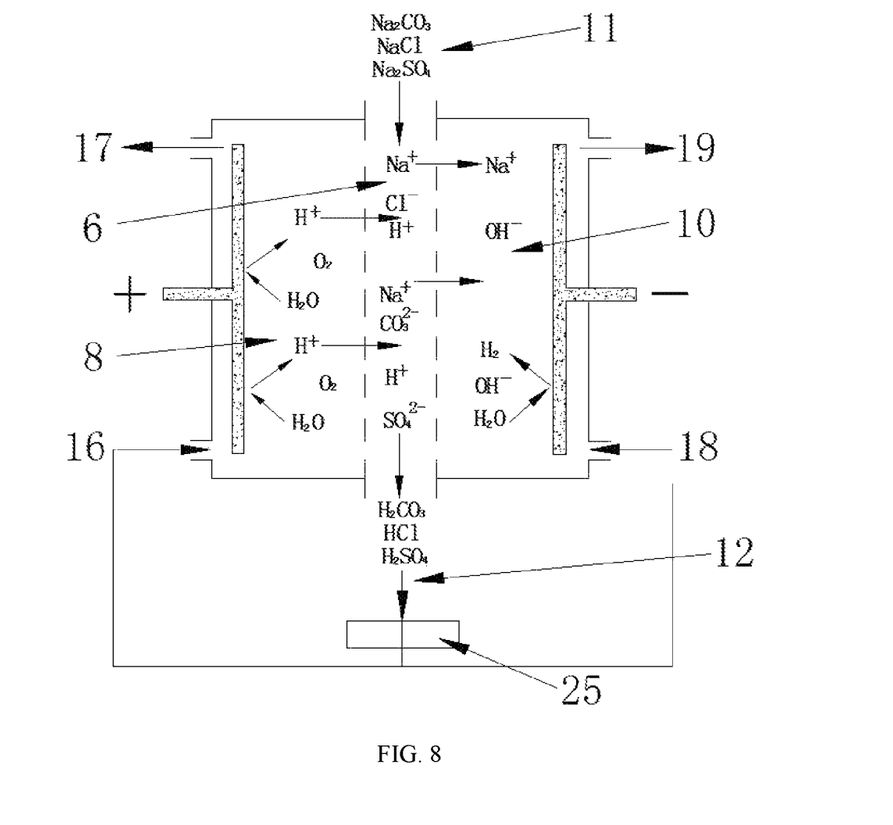
FIG. 8 is a schematic diagram illustrating the principle of the anion suppressor of the present invention.

On the basis of Embodiment 3, as shown in FIG. 8, (it should be noted that FIG. 8 shows a schematic diagram of the principle of an anion suppressor (as an example)), the eluent outlet 12 is connected to a conductivity cell 25; an outlet of the conductivity cell 25 is connected to the first electrolyte inlet 16; and the first electrolyte outlet 17 is connected to the second electrolyte inlet 18 through a hose. After passing through the interior of the suppressor, an eluent flows from the eluent outlet 12 into the conductivity cell 25. The outlet of the conductivity cell 25 is connected to the first electrolyte inlet 16, and after passing through the conductivity cell, an electrolyte flows into the first electrolysis chamber 8. Since the first electrolyte outlet 17 and the second electrolyte inlet 18 are connected through a hose, after flowing out from the first electrolysis chamber 8, the electrolyte flows into the second electrolysis chamber 10 for an electrolysis reaction, and finally flows out through the exhaust gas-liquid outlet 19. The electrolyte obtained at this time can also be referred to as a regeneration solution. This arrangement can realize the automatic regeneration of the suppressor device without an external water pipe for the suppressor, which involves convenient operations and saves water resources.

The basic principles and main features of the present invention and the advantages of the present invention are illustrated and described above. For those skilled in the art, it is obvious that the present invention is not limited to the details of the above embodiments, and the present invention can be implemented in other specific forms without departing from the spirit or basic features of the present invention. The embodiments should be regarded as exemplary and non-limiting in every respect, and the scope of the present invention is defined by the appended claims rather than the above description. Therefore, all changes falling within the meaning and scope of equivalent elements of the claims should be included in the present invention. The reference numeral in the claims should not be considered as limiting the involved claims.

It should be understood that although this specification is described in accordance with the embodiments, not every embodiment includes only an independent technical solution. Such a description is merely for the sake of clarity, and those skilled in the art should take the specification as a whole. The technical solutions in the embodiments can also be appropriately combined to form other implementations which are comprehensible for those skilled in the art.

What is claimed is:

1. An ion chromatography (IC) suppressor, comprising a first clamping plate, an intermediate plate, a second clamping plate, a first ion exchange membrane, a first electrode and a second electrode, wherein
    the first clamping plate, the intermediate plate and the second clamping plate are tightly buckled in sequence to compact the first ion exchange membrane between the first clamping plate and the intermediate plate and compact the second ion exchange membrane between the intermediate plate and the second clamping plate;
    a suppression chamber is formed between the first ion exchange membrane and the second ion exchange membrane, and the suppression chamber is filled with resin particles for ion exchange and support;
    the first electrode is embedded on a first side of the first clamping plate, wherein the first side of the first clamping plate is adjacent to the intermediate plate, and a first electrolysis chamber is formed between the first electrode and the first ion exchange membrane;
    the second electrode is embedded on a first side of the second clamping plate, wherein the first side of the second clamping plate is adjacent to the intermediate plate, and a second electrolysis chamber is formed between the second electrode and the second ion exchange membrane;
    the first ion exchange membrane and the second ion exchange membrane separate the suppression chamber, the first electrolysis chamber, and the second electrolysis chamber into three independent chambers;
    an eluent inlet and an eluent outlet are provided respectively at two ends of the intermediate plate, and an accommodating groove for mounting a screen plate is formed at each of a tail end of the eluent inlet and a head end of the eluent outlet;
    a first electrolyte inlet and a electrolyte outlet are formed on a second side of the first clamping plate, wherein the second side of the first clamping plate is away from the intermediate plate; and
    a second electrolyte inlet and an exhaust gas-liquid outlet are formed on a second side of the second clamping plate, wherein the second side of the second clamping plate is away from the intermediate plate.

2. The IC suppressor according to claim 1, wherein the screen plate is provided at each of a tail end of the first electrolyte inlet, a head end of the electrolyte outlet, a tail end of the second electrolyte inlet), and a head end of the exhaust gas-liquid outlet.

3. The IC suppressor according to claim 1, wherein the first side of the first clamping plate and the first side of the second clamping plate are respectively provided with a sealing lip for sealing and separation, and the first ion exchange membrane and the second ion exchange membrane are respectively adapted to the sealing lip.

4. The IC suppressor according to claim 1, wherein a groove is formed on the intermediate plate, a shape of the groove is adapted to a shape of the first ion exchange membrane, and the groove is configured to mount and position the first ion exchange membrane.

5. The IC suppressor according to claim 1, wherein each of the first electrode and the second electrode is a titanium electrode, and a surface of the titanium electrode is coated with a corrosion-resistant inert metal.

6. The IC suppressor according to claim 1, wherein the first electrolysis chamber and the second electrolysis chamber are filled with the resin particles for support and diversion.

7. The IC suppressor according to claim 1, wherein an outer side of the first clamping plate and an outer side of the second clamping plate are provided with a first pressing plate and a second pressing plate, respectively; and the first pressing plate and the second pressing plate are connected through a bolt.

8. The IC suppressor according to claim 1, wherein an outer side of the first pressing plate and an outer side of the second pressing plate are provided with a first housing and a second housing, respectively; and the first housing and the second housing are buckled to package the first pressing plate, the first clamping plate, the first electrode, the first ion exchange membrane, the intermediate plate, the second ion exchange membrane, the second electrode, the second clamping plate, and the second pressing plate.

9. The IC suppressor according to claim 1, wherein the eluent outlet is connected to a conductivity cell; an outlet of the conductivity cell is connected to the first electrolyte inlet; and the first electrolyte outlet is connected to the second electrolyte inlet through a hose.

10. The IC suppressor according to claim 2, wherein the screen plate is made from polyethylene (PE).

11. The IC suppressor according to claim 1, wherein the screen plate is made from polyethylene.

* * * * *